United States Patent
Hanson

[19]

[11] Patent Number: 5,907,701
[45] Date of Patent: May 25, 1999

[54] MANAGEMENT OF COMPUTER PROCESSES HAVING DIFFERING OPERATIONAL PARAMETERS THROUGH AN ORDERED MULTI-PHASED STARTUP OF THE COMPUTER PROCESSES

[75] Inventor: Hugh S. Hanson, Norton, Mass.

[73] Assignee: The Foxboro Company, Foxboro, Mass.

[21] Appl. No.: 08/664,775

[22] Filed: Jun. 14, 1996

[51] Int. Cl.⁶ .................................................. G06F 9/00
[52] U.S. Cl. ........................................... 395/671; 395/672
[58] Field of Search ..................... 395/670, 680, 395/671, 682, 703, 672

[56] References Cited

U.S. PATENT DOCUMENTS

5,675,771  10/1997  Curley et al. ........................... 395/500
5,680,645  10/1997  Russell et al. ........................... 395/868

*Primary Examiner*—Majid A. Banankhah
*Attorney, Agent, or Firm*—Lahive & Cockfield, LLP

[57] ABSTRACT

A system and machine readable data storage medium for managing computer services having different operational parameters are described. The managed services provide an ordered, multi-phased startup of processes started by the services. The processes started by the services include background processes and interactive processes. The services are assigned operational parameters that define the environment for processes executed under a particular service. The system can further include apparatus and methods for monitoring the execution status of processes and for acting upon the processes as a function of their execution status. The system also includes synchronization flags to aid in providing an ordered startup of processes.

31 Claims, 4 Drawing Sheets

MANAGEMENT OF COMPUTER PROCESSES HAVING DIFFERING OPERATIONAL PARAMETERS THROUGH AN ORDERED MULTI-PHASED STARTUP OF THE COMPUTER PROCESSES

FIELD OF THE INVENTION

The present invention relates to process management systems in a computer operating system. In particular, the invention relates to process management functions and apparatus used to start-up, maintain, and terminate processes originating in a first operating system and operating within the context of a second foreign operating system.

BACKGROUND OF THE INVENTION

Operating systems typically provide an environment in which computer programs run. Operating systems enable computer programs to communicate with a variety of electronic devices, such as various input/output devices. For instance, the MS-DOS operating system, created by Microsoft, provides for communications between disk drives and the software instructions executed on a personal computer running under the MS-DOS operating system. Since the origination of MS-DOS, operating systems have evolved into an all-encompassing bridge between the electronic hardware devices forming the computer and the software running on the computer. Today's operating systems make the computer easier to use by creating a "virtual machine" that shields the user from the details of interactions with a variety of computer hardware, and by controlling the distribution of hardware resources, such as memory and processor time.

A number of different operating systems exist, each one providing different methods for communicating with computer hardware. Representative operating systems include: UNIX, SunOS, Solaris SVR4, DOS, Windows, and Windows NT. Each of these operating systems interacts differently with the underlying computer hardware, and accordingly each requires different software instructions to implement an operation, and more importantly each operating system makes use of different methods to achieve the same general task, such as saving a program on a floppy disk.

The environment formed by any particular operating systems may provide methods for starting, maintaining, and terminating a program that differ dramatically from the methods utilized by another operating system. For instance, the MS-DOS operating system fails to provide for the graphical user interface utilized in later Window Operating Systems. These differences in operating systems require software applications to interact differently with various operating systems to communicate with the underlying electronic hardware. Accordingly, software application programs written under a first operating system must be altered to successfully execute under a second different operating system.

Software interpreters exist which reinterpret a set of software instructions written for execution under a first operating system, such that the reinterpreted set of software instructions are executable by a second operating system. For example, the NuTCracker product, from DataFocus, can interpret a UNIX program so that it can run on Windows NT. However, these software interpreters do not guarantee that the set of software instructions will execute in a manner that achieves the same results obtained under the original operating system, rather the software interpreters only guarantee that the interpreted software instructions are executable. To obtain a new set of instructions capable of operating under the new operating systems in the same manner that the set of instructions operated under the old operating system, something must account for the differences in how the operating systems interact with the underlying computer hardware.

Accordingly, an object of the invention is to provide a data processing method that enhances the portability of a software system architecture between operating systems Other general and specific objects of this invention will be apparent and evident from the accompanying drawings and the following description.

SUMMARY OF THE INVENTION

The invention achieves the foregoing and other objects with a computerized data processing system for managing a plurality of services, each service having different operational parameters and each service being responsible for the execution of various processes. For this application, the terms "server" or "service" refers to a component of an operating system that provides a set of functions—for example, memory functions, process creation functions, or process managing functions. Each service executes a loop that checks whether other components of the operating system have requested one or more of its functions. When a service is requested to provide a function, it provides the requested functions by implementing one of its allocated "processes". The term "processes" refers to a set of executable instructions that are implemented by the computer.

The invention accounts for the differences between various operating systems by managing a plurality of services, each service acting in a manner that creates a particular environment found under the old operating system but not found in the new operating system. Additionally, the invention executes processes in an ordered, multi-phase startup. The ordered multi-phased startup of processes provides for a controlled environment capable of emulating various operating environments found in the old operating system and used for interacting with the underlying electronic hardware. That is, the multi-phased startup causes a list of background processes to be implemented with a set of operational parameters associated with a primary service, and causes a list of interactive processes to be implemented with a set of operational parameters associated with a secondary service.

By executing the plurality of services in the manner described above, various processes can be implemented under different sets of operational parameters within the same operating system. The plurality of services thereby provide the backbone of an operating system capable of implementing software instructions originally developed for a foreign operating system. The backbone of the operating system accounts for the differences between the present operating system and the foreign operating system under which the software instructions were initially developed.

In one embodiment, the invention provides for a computerized data processing method for managing a plurality of services under different operational parameters. The computerized method includes the steps of starting a primary service and starting a secondary service. The primary service is capable of executing a list of background processes, each of which is assigned a first operational parameter. The secondary service is capable of executing a list of interactive processes, each of which is assigned a second operational parameter. The first and second operational parameters assigned to each of the services generally specify the operational environment assigned to each service. That is, the primary service exists within a first operational environment and the second service exists within a second operational environment. The various facets of the operational parameters include security levels, protection of files from unauthorized access, control over the startup, maintenance, and termination of various processes within the service, access to various resources within the operating system, and privileges to administrative functions within the operating system.

Further in accordance with this embodiment, the computerized processing method provides for the ordered, multi-phased startup of processes. In particular, the processing method requires that all services are first started, after which the processing method causes a list of background processes to be executed. After executing the background processes the method causes the execution of a list of interactive processes. Background processes include core processes that need to be monitored or that need to be restarted if terminated. Interactive processes are optional, non-core, processes that can include some form of interface with the user. Accordingly, the core processes vital to the operating system are executed before the processes that are optional to the operating system.

A further aspect of the invention provides for a method of starting background processes and monitoring the execution status of the background processes. This step is particularly applicable in those circumstances wherein the background processes include core processes that can only be terminated with users or client applications having a high security clearance. This aspect of the invention further provides for a step of restarting those background processes as a function of the execution status of the background process. For example, if a monitored core process is terminated the core process will be restarted once the operating system recognizes that the core process was terminated.

Additional aspects of the invention include providing steps that aid in synchronizing the execution of the various processes. For example, a synchronization flag can be set after all background processes have been executed by the primary server, and the execution of the interactive processes by the secondary server can be delayed until the synchronization flag has been set. This synchronization method ensures an ordered startup of the background and interactive processes. Other aspects of the invention, in comparison, includes methods for executing processes asynchronously.

Another practice of the invention includes configuring the primary service and the secondary service prior to starting the services. Typically, the configuring steps define the list of background processes that are ready for execution and defining the list of interactive processes that are ready for execution. Configuring can further include the steps of associating with the primary service a first tag identifying the list of background processes, and associating with the secondary service a second tag identifying the list of interactive processes. Under other aspects of the invention, the operational parameters assigned to any particular service can be assigned during the configuration phase of the invention.

Further embodiments of the invention include a data processing apparatus for managing a plurality of processes executing under differing operational parameters. The data processing apparatus comprises a configuration database for storing and retrieving an executable instruction set, and a operating system coupled with the configuration database for executing the instruction set. Additionally, the operating system can include a first functional element for starting a primary service for executing a list of background processes and a second functional element for starting a secondary service for executing a list of interactive processes. The list of background processes are each assigned a first operational parameter, and the list of interactive processes are each assigned a second operational parameter. The operating system further includes functional elements for executing the list of background processes with the primary service and for executing the list of interactive processes with the secondary service. Accordingly, the data processing apparatus provides for an ordered multi-phased startup of the background processes and the interactive processes.

Additional aspects of the data processing apparatus provide for a service controller that can monitor the execution status of processes, restart processes, and synchronize processes. The service controller typically synchronizes processes by identifying the states of synchronization flags that identify occurrence of various processing events, such as the execution of all background processes. In addition, the service controller can trigger other actions based upon synchronization flags being set, such as the triggering of the execution of the interactive processes. In comparison, the data processing apparatus can also include functional element for executing processes synchronously.

Further in accordance with this embodiment, the configuration database can include memory space for storing a first list of processes ready for execution. The configuration database can also store parametric information representative of a tag that is associated with a particular service and that identifies the operational characteristics of the list of processes in the configuration database.

Other embodiments of the invention comprise a machine readable data storage medium. The machine readable data storage medium can include a floppy disc, a compact diskette, a hard drive, magnetic tape, volatile memory, or any other machine readable data storage device typically known in the art that stores instruction for implementing the systems described herein for managing computer processes having different operational parameters. In particular, the machine readable data storage medium includes process desription information used by a primary service for executing a list of background processes, each of which is assigned a first operational parameter; instructions for starting a secondary service for executing a list of interactive processes, each of which is assigned a second operational parameter; instructions for executing said list of background processes with said primary service; and instructions for executing said list of interactive processes with said secondary service.

BRIEF DESCRIPTION OF THE DRAWINGS

The foregoing and other objects, features and advantages of the invention will be apparent from the following description of preferred embodiments, as illustrated in the accompanying drawings in which like reference characters refer to the same elements throughout the different views.

DESCRIPTION OF ILLUSTRATED EMBODIMENTS

Figure 1:
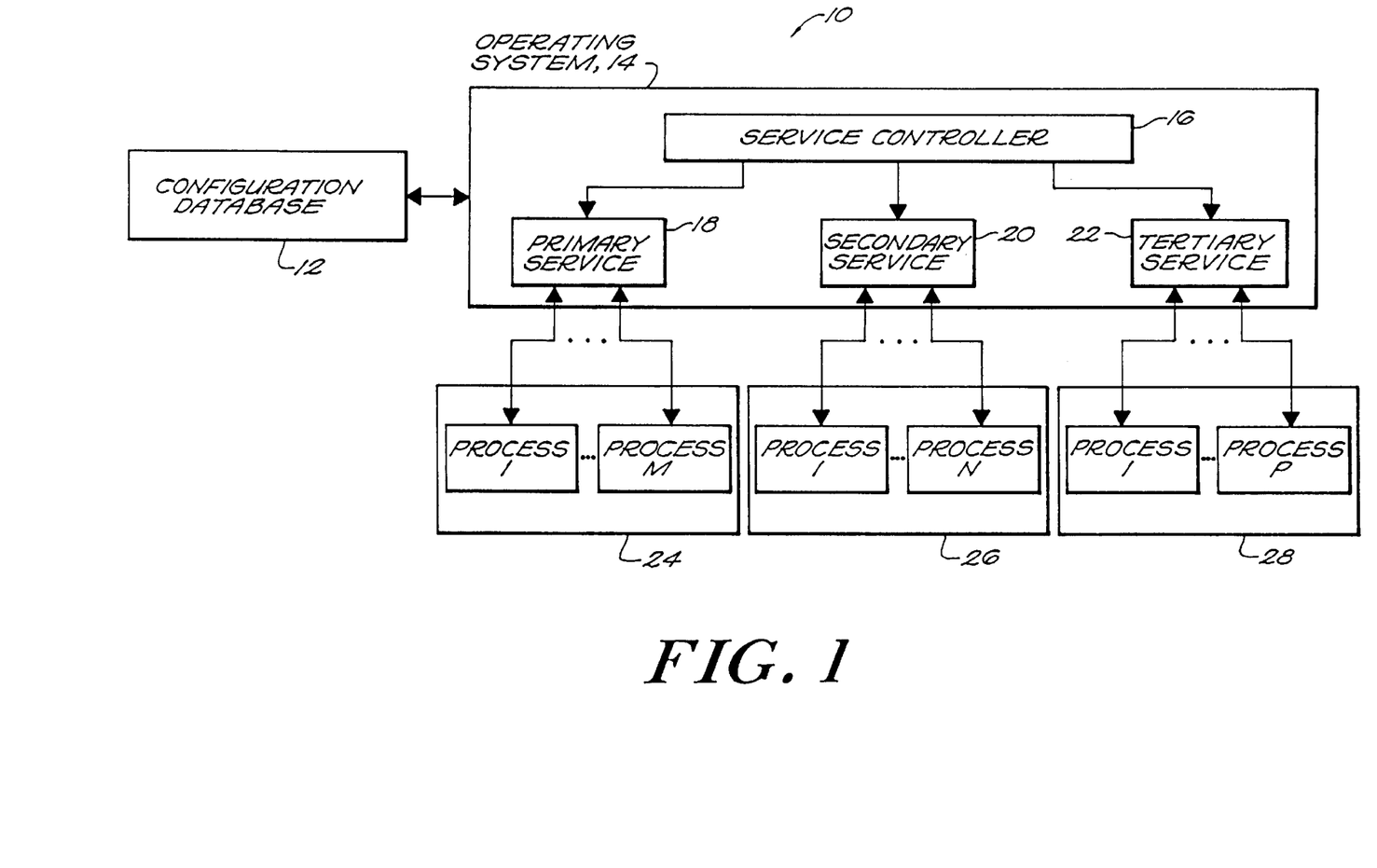
FIG. 1 is a block diagram of a system according to the present invention.

FIG. 1 illustrates a data processing apparatus 10 comprising a configuration database 12 and a operating system 14.

The data processing apparatus 10 exists within a computer, and can be implemented using either hardware, software, or a combination thereof. For instance, configuration database 12 can be formed of Random Access Memory commonly used in the art, or configuration database 12 can exist in a virtual memory space implemented on personal computers. The operating system 14 can be implemented in hardware using digital circuitry, or it can be implemented using software instructions stored in configuration database 12.

Operating system 14 further includes a service controller 16, a primary service 18, a secondary service 20, and a ternary service 22. The service controller 16 directs operations within the services 18, 20, and 22. While the primary service 18 interacts with a first set of processes 24, and the secondary service 20 interacts with a second set of processes 26, and the ternary service 22 interacts with a third set of processes 28. The first set of processes 24 includes processes labeled 1 through M, the second set of processes includes processes labeled 1 through N, and the third set of processes includes processes labeled 1 through P.

The service controller 16 starts and manages the services 18, 19 and 20. The services 18, 20, and 22 create the environment in which their respective processes 24, 26, and 28 operate. In addition, services 18, 20, and 22 control the start-up, maintenance, and termination of their associated processes. Service 18 generates the synchronization event which services 20 and 22 use to trigger phase 2 process startup. Configuration database 12 acts as repository for the operating system 14.

The apparatus illustrated in FIG. 1 provides for the ability to execute an application program under a first operating system when the application program includes instructions originally written for execution under a second foreign operating system. For example, the data processing apparatus 10 can implement a software application under the Windows NT operating system even though the software application includes instructions originally written for operation under a UNIX operating system. Accordingly, the data processing apparatus 10 aids in porting a software application from a UNIX environment to a Windows NT environment.

In a preferred embodiment of the invention, the data processing apparatus 10 is implemented under the Windows NT operating system. The service controller 16 is referred to as the Service Control Manager under the Windows NT operating system. The primary service 18, the secondary service 20, and the ternary service 22 are installed within the Windows NT environment using the Create Service Function in accordance with the disclosures herein. All software modules are built using VC++2.2 project makefiles, and the Microsoft tool set that ships with VC++2.2.

When porting a software application from UNIX to Windows NT, three services are preferably used to manage processes due to the nature of the differences between UNIX and Windows NT operating systems. When implemented under Windows NT, the primary service 18 starts core processes within the ported software application. Typically, the core processes need to be monitored when started or need to be restarted if they terminate. These processes do not interact with the Windows desktop. The secondary service 20 starts third party applications requiring interaction with the Windows desktop. These application may or may not require monitoring. The ternary service 22 starts non-core processes within the ported software application. These processes are optional and do not require monitoring.

In a first aspect of the invention, the primary service 18 and the ternary service 22 are in separate executables, while in a second aspect of the invention, the primary service 18 and the secondary service 22 are combined into a single service. In the first aspect of the invention, the services remain separate because differences in the operational parameters of the primary and ternary services require that each be implemented under separate services. In the second aspect of the invention, the operational parameters of the first and third services are sufficiently similar that they can be combined into a single service.

For instance, under one embodiment of the invention, when a software application is being ported from UNIX to Windows NT, the primary and ternary services use the same logon account (as implemented under Windows NT) and neither interact with the Windows desktop. Accordingly, under this embodiment, the service are candidates for being combined into the same service. However, under other embodiments of the invention the primary service and the ternary service remain in separate executables. For example, if the primary service and the ternary service might require individual logon accounts, or if a process under the ternary service requires interaction with the desktop, the services are not combined. Generally, when the services implement processes requiring the same operational parameters, the services are combined into a single executable service. When the services require different operational parameters, the services are not combined.

With further reference to FIG. 1, the services 18, 20, 22 are installed using the CreateService( ) function of Windows NT, but the services also include registry used to control the processes 24, 26, and 28 associated with each service, respectively. For example, the primary service 18 can include, in addition to the standard service key and associated values created in the registry by the CreateService( ) function, additional subkeys and values created during the configuration stage of the service that identify the operational parameters. These subkeys and values describe processes which the service will attempt to start, and additional information concerning the processes.

For instance, the primary service can be configured to include an "Applications key" and a "Parameters key". The Applications key has one or more subkeys which describe executables (CMD, COM, EXE, or BAT files) to run. The required values of these subkeys and their usage is explained in the table below.

| Value Name | Data type | Description |
|---|---|---|
| AppDir | REG_EXPAND_SZ | Specifies the Working (default) directory of the process. |
| Application | REG_EXPAND_SZ | Image pathname. |
| AppParameters | REG_EXPAND_SZ | Process command line parameters. |
| Mode | REG_DWORD | Flag set controlling startup and monitoring of the process. (Flags defined in procent.hpp) |
| Order | REG_DWORD | Specifies relative process start order. The process with the lowest order number is started first. |

Accordingly, the configured primary service has at least one tag, such as the applications subkey. The tag identifies the location of a list of processes stored in configuration database 12, designated as the Registry on Windows NT. The tag can also identify the location of various application subkeys associated with the processes being executed under the primary service. These subkeys include operational parameters defining how the primary server controls the execution of the processes identified by the tag. In addition, the primary service is typically configured such that the processes associated with the primary service are executed in a particular order.

The Secondary Service 20 can be configured in a manner analogous to that described with respect to the primary service 18. For example, the secondary service 20 can include, in addition to the standard service key and associated values created in the registry by the CreateService( ) function, additional subkeys and values created during the configuration stage of the service. These subkeys and values describe processes which the service will attempt to start. For instance, the secondary service can be configured by defining an "Applications key". The Applications key has one or more subkeys which describe executables (CMD, COM, EXE, or BAT files) to run. The required values of these subkeys and their usage is explained in the table below.

| Value Name | Data type | Description |
| --- | --- | --- |
| AppDir | REG_EXPAND_SZ | Specifies the Working (default) directory of the process. |
| Application | REG_EXPAND_SZ | Image pathname. |
| AppParameters | REG_EXPAND_SZ | Process command line parameters. |
| Mode | REG_DWORD | Flag set controlling startup and monitoring of the process. (Flags defined in procent.hpp) |
| Order | REG_DWORD | Specifies relative process start order. The process with the lowest order number is started first. |
| Requires IA | REG_DWORD | If 0 this process does not require core processes to run. If 1 this processes require that core process are running before it is started. Processes with this flag set are not started until after the "FMonLastChild" event has become signaled. |

The ternary service 22 is configured in a completely different manner than service 18 or 20. Instead of additional subkeys of the registry key created for the service when it was installed by the CreateServe function, it reads a pair of data files to determine the process set it will start.

However, the ternary service is preferably configured to include a broader scope of applications being executed. The ternary service frequently is used to control optional applications forming part of the ported software application and applications that are native to the new operating system.

For example, the ternary service 22 might process a file containing the names of optional installed packages to be run when the ported software application starts up. The service 22 generates a log file that contains a time and date header followed by a status entry for each process it starts.

The log file contains entry for each application listed in the list of processes associated with the ternary service 22. These entries indicate the success or failure of the service 22 in attempting to run each particular application. The service 22 can further process a second file containing the fully qualified pathnames of optional, installed user applications to be run when the ported software application starts. The ternary service 22 also generates a log file for this set of processes. The log file contains a time and date header indicating when processing began on user requested application. There is an entry for each application listed in the data file describing the results of the attempt to start the application.

Figure 2:
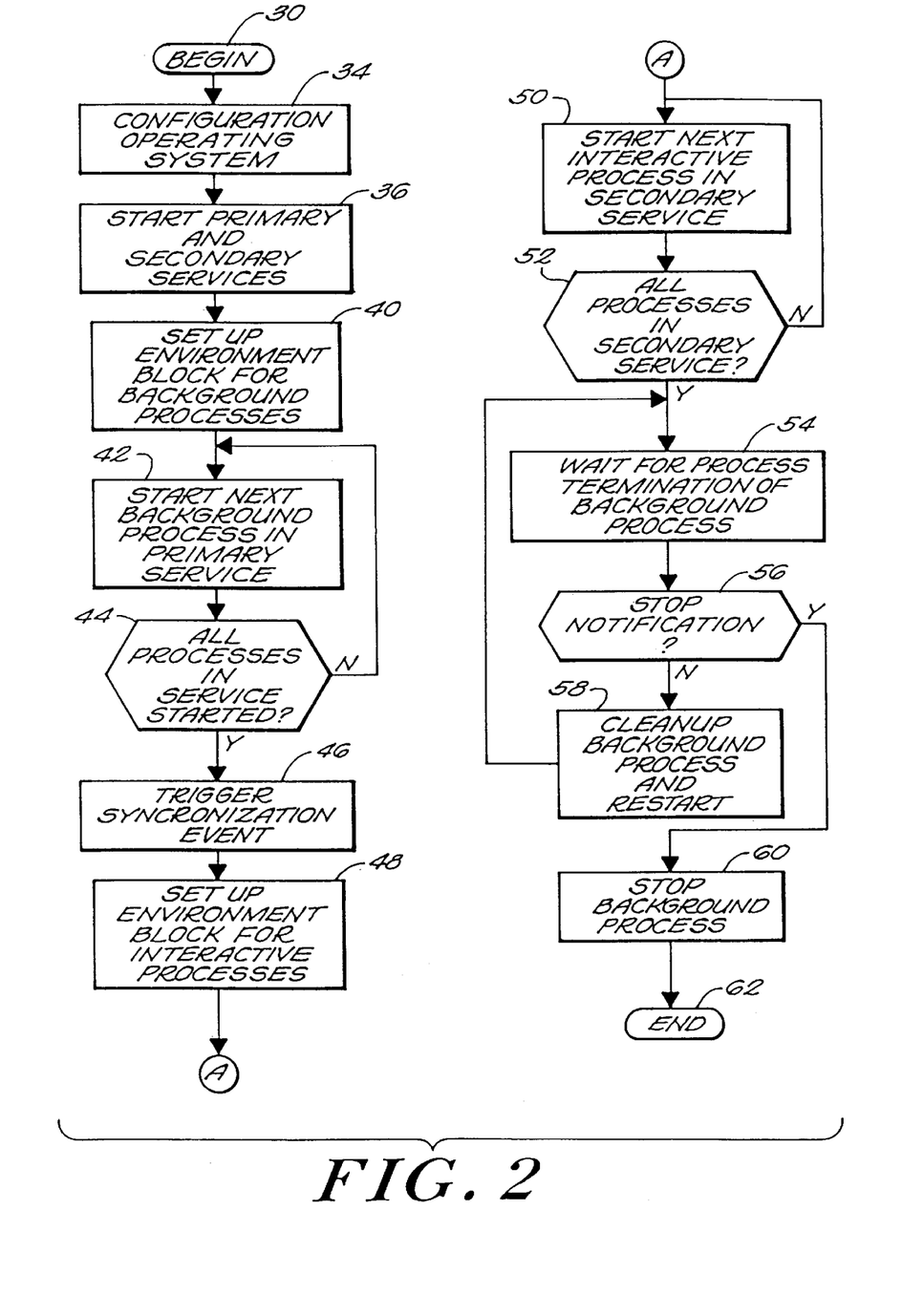
FIG. 2 is a flow chart illustrating a sequence of steps executed by the system shown in FIG. 1 and FIGS. 3 and 3A are flow charts illustrating an alternative sequence of steps executed by the system shown in FIG. 1.

FIG. 2 illustrates a flow chart of operations whereby data processing apparatus I 0 manages a plurality of services under differing operational parameters. The illustrated flow chart shows steps performed by a simplified data processing apparatus having only two services, in comparison to the flow chart shown in FIG. 3 for a data processing apparatus having 3 services.

Logical flow in the illustrated sequence begins at step 30, and proceeds to step 34. At step 34 the operating system is configured. During configuration, the primary and secondary services 18, 20 are associated with a particular group of processes and the interaction between the services 18, 20 and their associated processes are defined. Tags identifying a list of processes to be executed and tags identifying operational parameters for the processes listed are generated during the configuration phase. The tags are generated, in the Windows NT operating system, using the the NT registry manipulation functions to create registry parameters used by the service. After step 34, the data processing apparatus executes step 36.

At step 36, the primary and secondary services are started. The service controller 16 starts the primary and secondary services concurrently. Typically, as in Windows NT, the primary and secondary services are started upon start-up of the system. Following step 36, logical flow proceeds to step 38.

At step 40, the data processing apparatus 10 sets up the environment block for the background processes. This step creates an environment which emulates the native environment of the ported processes under the current operating system. For instance, when a UNIX software application is ported to Windows NT, primary service sets up a process environment that the UNIX background processes are accustomed to seeing at step 40. Following step 40, flow proceeds to step 42.

At step 42, the background processes associated with the primary server are executed one at a time. The background processes are executed in the order defined by the operational parameters associated with the primary server. After a background process from the list of defined background processes is executed, logical flow proceeds to step 44.

At step 44, primary service determines whether all processes in the list of background processes have been executed. If all processes are have not been executed, logical flow branches back to step 42 where the next process in the list of background processes is executed. If all processes have been executed, logical flow continues on to step 46.

At step 46, primary service triggers a synchronization event indicating that all background processes are executing. This synchronization event triggers the secondary service. Prior to this synchronizing event, the secondary starts interactive processes which do not require core process set to run. It then waits for the synchronization event to occur. After step 46, logical flow proceeds to step 48.

At step 48, secondary service sets up the environment block for the interactive processes. This step creates an environment which emulates the native environment of the ported processes under the current operating system. For instance, when a UNIX software application is ported to Windows NT, the environment block can be set up to include the set of variables required to run the Korn shell. This particular environment block insures that shell scripts run from processes that descend from primary service execute properly. Following step 48, flow proceeds to step 50.

At step 50, the interactive processes associated with the secondary server are executed one at a time. The interactive processes are executed in the order defined by the operational parameters associated with the secondary server. After an interactive process from the list of defined interactive processes is executed, logical flow proceeds to step 52.

At step 52, secondary server determines whether all processes in the list of interactive processes have been executed. If all processes are have not been executed, logical flow branches back to step 50 where the next process in the list of interactive processes is executed. If all processes have been executed, logical flow continues on to step 54.

At step 54, secondary server monitors the execution status of the background processes. If a background process terminates, logical flow proceeds to step 56. At step 56, the data processing apparatus 10 reviews whether a stop notification authorizing termination of the background process was received. If the stop notification was not received, then control branches back to step 54 through step 58. If the stop notification was received, then control proceeds to step 60 where the terminated background process is allowed to completely terminate.

Steps 54–60 are particularly applicable when a UNIX software application is ported to a Windows NT operating system. Under an UNIX operating system, software applications are not terminated when a user logs off the system. Rather, a system administrator determines when a software application is terminated. In comparison, under Windows NT, a software application can be terminated when a user logs off the system. Accordingly, when a UNIX software application is ported to a Windows NT operating system, unwanted terminations of the software application can occur. Steps 54–60, in conjunction with the other steps illustrated in FIG. 2, prevent the unwarranted termination of a software application by executing these software applications under the primary server as a background process. By properly managing the services operating under different operational parameters, this system thus provides for the ability to successfully execute a UNIX type software application under the Windows NT operating system.

Step 58 proceeds from the "NO" decision reached at decision block 56. Step 58 cleans up a terminated background process so that a background process may be restarted. After cleaning up the terminated background process, step 58 restarts the background process and returns control to step 54.

Figure 3:
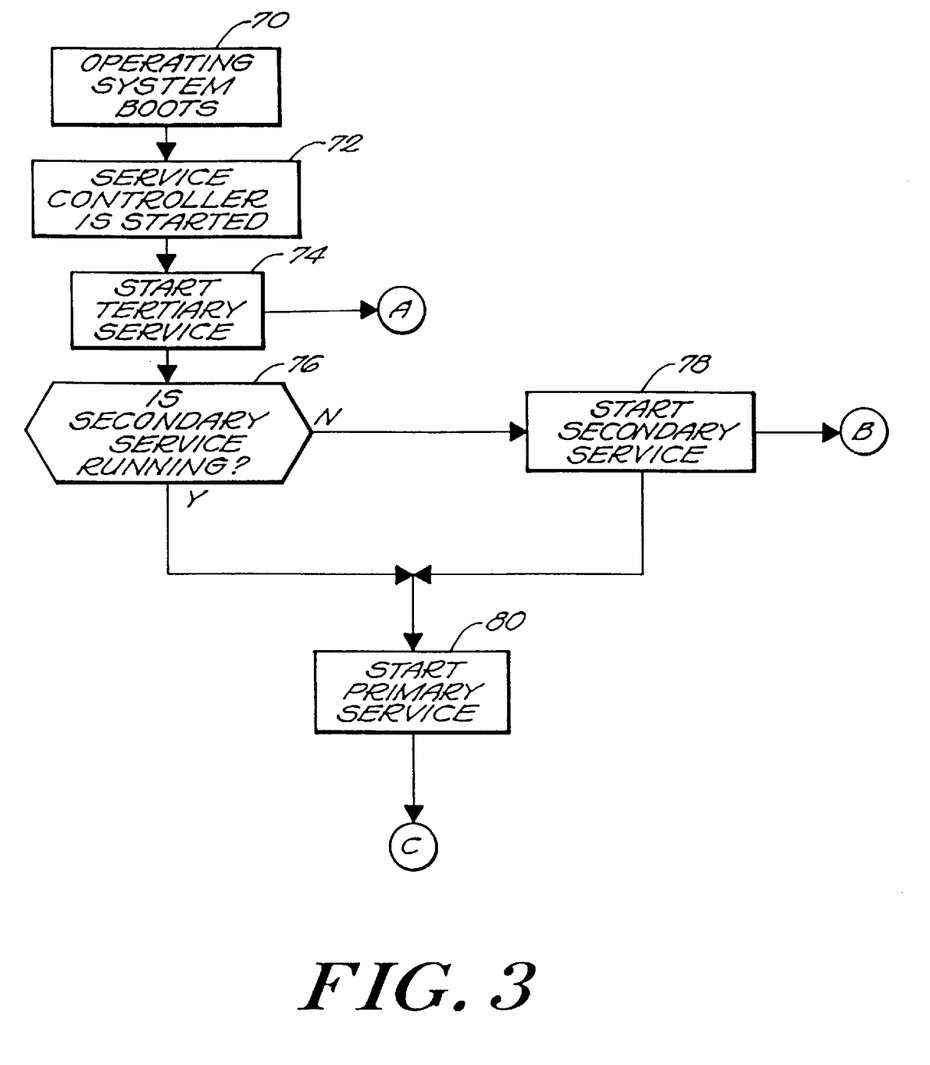
Figure 3A:
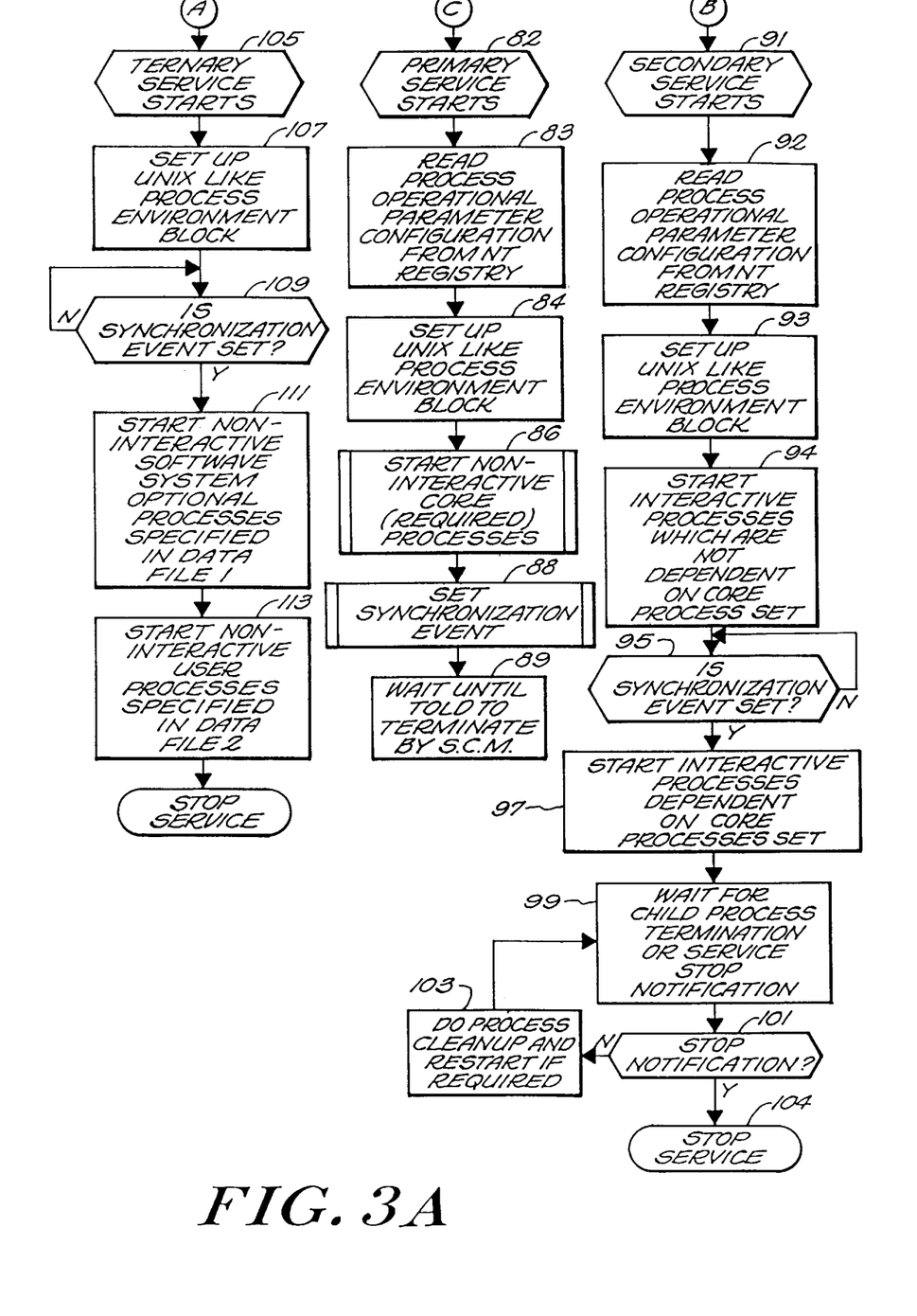

FIGS. 3 and 3A illustrate a flow chart of operations whereby data processing apparatus 10 manages a plurality of services under different operational parameters. The illustrated flow chart shows steps performed by a data processing apparatus having 3 services and being implemented under a Windows NT operating system.

FIG. 3 illustrates the broad interrelationships between the primary, secondary, and ternary services 18, 20, and 22 as they are started by the service controller 16. In particular, at step 70 the operating system starts up. After step 70, logical flow proceeds to step 72.

At step 72, operating system 10 starts the service controller. Thereafter, the process proceeds to step 74.

At step 74, the service controller 16 starts the ternary service in accordance with the detailed flow chart shown in FIG. 3A. After step 74, logical flow proceeds to step 76.

At step 76, service controller 16 determines whether the secondary service is running, If the secondary service is not running, then the secondary service is started at step 78. If the secondary service is running, then control proceeds to step 80. At step 80, the processing apparatus 10 starts the primary service.

FIG. 3 thus illustrates an overview for starting the primary, secondary, and ternary services, while FIG. 3A details the steps followed in executing each of the particular the services. FIGS. 3 and 3A, in combination, present a method wherein the services are executed concurrently but the processes executed by the services are not. In particular, the background processes executed by the primary service are executed before the processes associated with the secondary and ternary services.

FIG. 3A, step 82, illustrates the start of the primary service 18. The service is started automatically by the service controller 16 during the Windows NT boot process. The primary service is a simple process starting engine that builds a list of processes to be started from subkeys under it's service key, and then executes them. The primary service includes operational parameters defining its characteristics and the characteristics of processes executed under the primary service.

In one embodiment, the primary service supports starting of all Windows NT executable types (CMD, BAT, COM, and EXE.). Typically the primary service does not support execution of UNIX shell scripts. The service runs in it's own process and cannot interact with the Windows desktop. Consequently, the processes started by the service cannot interact with the desktop. After step 82, logical control proceeds to step 83.

At step 83, the data processing apparatus 10 reads the operational parameter configuration from the Windows NT registry. After step 83, flow proceeds to step 84.

At step 84, the environment block of the primary service is defined. For instance, the environment block can be set up to include the set of variables required to run a Korn shell. This particular environment block insures that shell scripts run from processes that descend from primary service execute properly. The environment block established under step 84 is inherited by all the processes started by the primary service. After step 84, flow proceeds to step 86.

At step 86, the data processing apparatus 10 starts the background processes. The background processes are started according to the order determined by the operational parameters associated with the background processes. Each background process includes at least one process subkey having values that specify how the process is started, if it is monitored after it is started, and it's position in the processes list. Based on these process subkeys, in particular the "Application" subkey, a list of process entry objects is built. The order of processes in the built list is specified by the "Order" value entry under the process subkey. The order of the process list determines the sequence of processes startup. The first process in the list is run first, and the last process in the list is run last. In addition, each process in the list is started and or monitored according to the flags specified.

At step 88, the execution of the background processes are monitored. After all processes in the list have been started the primary service waits until it is signaled to terminate. In addition, at step 88 a synchronization event is set indicating that the core processes have been started.

At step 89, the primary service wait until it is told to terminate by the service controller 16. Once the primary service is instructed to terminate, the service performs cleanup and exits.

FIG. 3A further illustrates the methods steps of the secondary service, beginning with step 91. At step 91, the secondary service 20 is started automatically by the service controller 16 during the Windows NT boot process. The secondary service, similar to the primary service, acts as a process starting engine. The secondary service includes operational parameters defining its characteristics and the characteristics of processes executed under the secondary service.

In another embodiment, the secondary service can start third party application that interacts with the Windows desktop. Accordingly, the processes started by the secondary service are grouped into two further categories: (1) those asynchronous processes that can be started before the core processes have started as shown in Step 38 of FIG. 2; and (2) those processes that must be started after the core processes have started. As shown in FIG. 2, the asynchronous processes can be started at any time after the secondary service has started. Processes started before the core processes have started typically include third party applications that require interaction with the desktop (i.e. interactive processes).

The secondary service runs in it's own process and can interact with the Windows NT desktop. Consequently, those processes started by the service can also interact with the Windows desktop. After step 91, logical flow proceeds to step 92.

At step 92, the data processing apparatus 10 reads the operational parameter configuration from the Windows NT registry. After step 92, flow proceeds to step 93.

At step 93, the environment block of the secondary service is defined. For example, the environment block can be set to include the set of variables required to run the a Korn shell. This environment will then be inherited by all the processes started by the service. This insures that shell scripts run from processes that descend from the secondary service execute properly. After step 93, control proceeds to step 94.

At step 94, the data processing apparatus 10 starts the interactive processes which are not dependent on the core process set. After step 94, control proceeds to step 95.

At step 95, the secondary service waits for a synchronization flag. For example, the secondary service can wait until the flag set in step 88 becomes signaled, indicating that all core processes have been started. Once the synchronization flag is set, control proceeds to step 97.

At step 97, secondary service enters the second phase processes startup and starts the interactive processes which require the core process set to be running. The interactive processes are started according to the order determined by the operational parameters associated with the interactive processes. Each interactive process is described by a subkey having values that specify how the process is started, if it is monitored after it is started, and it's position in the processes list. Based on these process subkeys, in particular the "Application" subkey, a list of process entry objects is built. The order of processes in the built list is specified by the "Order" value entry under the process subkey. The order of the process list determines the sequence of processes startup. The first process in the list is run first, and the last process in the list is run last. In addition, each process in the list is started and or monitored according to the flags specified. After step 99, logical control proceeds to step 99.

At step 99, after all dependent interactive processes have started, the data processing apparatus 10 begins monitoring the processes started. An array of event handles is built to aid in the monitoring of the processes. This array contains the handle of the termination event and the handle of each processes it has started. A function WaitFor MultipleObjects( ) is then called, this function is used to identify when a process is terminated or a service receives a stop notification. When any of the events become signaled, the data processing apparatus 10 wakes up and determines which event was signaled. After which, control proceeds to decision box 101.

At decision box 101, secondary service analyzes the event and determines whether a particular process can be allowed to terminate. In particular, if one of the processes terminated, it is looked up in the processes entry list. If the processes entry data member has the restart flag set, then logical control proceeds to step 103. At step 103 the process handles are closed and the process is restarted. If the process entry data member does not have the restart flag set, then logical control proceeds to step 104.

At step 104 the process handles are closed and no other action is taken. The Event array list is rebuilt as before, removing any processes which are no longer running. If the termination event becomes signaled the secondary service exits the monitor state. Once the secondary service is instructed to terminate, the service deleted all processes in the process list and returns back into the ServiceMain( ) function, which in turn returns to the service controller 16.

FIG. 3A further illustrates the methods steps of the ternary service, beginning with step 105. At step 105, the ternary service 22 is started automatically by the service controller 16 during the Windows NT boot process. The ternary service, similar to the primary service, acts as a process starting engine. The ternary service includes operational parameters defining its characteristics and the characteristics of processes executed under the ternary service.

The ternary service runs optional applications in the ported software and user applications after all the background processes have been started. The ternary service can run all types of NT executables as well as Korn shell scripts. The service cannot interact with the Windows NT desktop, and consequently, the processes started by the service cannot interact with the desktop. The ternary service may run in it own Windows NT account, or it may run under the same account utilized by the primary service. After step 105, logical flow proceeds to step 107.

At step 107, the environment block of the ternary service is defined. For instance, the environment block can be set up to include the set of variables required to run the a Korn shell. This particular environment block insures that shell scripts run from processes that descend from ternary service execute properly. The environment block established under step 107 is inherited by all the processes started by the ternary service. After step 107, flow proceeds to step 109.

At step 109, the data processing apparatus 10 causes the ternary service to wait for a synchronization flag. For example, the ternary service can wait until the flag for the FMonLastChild event becomes signaled, indicating that all background processes have been started. Once the synchronization flag is set, control proceeds to step 111.

At step 111, ternary service executes the optional background processes associated with the ternary service. The optional background processes are identified in a file containing a list of the optional background processes ready for execution. The ternary service attempts to start each process in the list, and records whether the attempted execution of the process resulting in success or failure. Afterwards, logical flow proceeds to step 113.

At step 113, the ternary service attempts to open the user application data file containing a list of fully qualified application path names, one per line. The service reads the file and attempts to run each of the applications. A log file is created containing a timestamp header and an entry for each application. After step 113 has been completed, the ternary service then sleeps for a predetermined period of time. After the sleep period, the service returns back to the ServiceMain( ) function, which in turn returns control to the service controller 16.

The above described process management system according to the invention employs an ordered, multi-phased startup of a plurality of processes to create an environment within an operating system that successfully executes software applications ported from a foreign operating system. In a preferred embodiment, the process management system facilitates, within the Windows NT operating system, the automated startup, shutdown, and monitoring of processes required for a UNIX based software application. In addition, the process management system allows a UNIX based software application to execute under a plurality of security levels within the Windows NT operating system. By assigning different functions found within the UNIX based software application to different services that are assigned different security levels within the process management system, the functions can operate under differing security levels within the Window NT operating system.

Although preferred embodiments of the invention have been described hereinabove in detail, they illustrate the invention and thereby enable those skilled in this art to adapt the teachings herein to various different applications requiring modifications of the computer process management system described. Thus, specific details of the disclosure herein are not intended to be necessary limitations on the scope of the invention other than as required by the prior art.

Having described the invention, what is claimed as new and secured by Letters Patent is:

1. A computerized data processing method for emulating a foreign operating system by managing a plurality of services under differing operational parameters, said method comprising the steps of starting a primary service for executing a list of background processes, each of which is assigned a first set of operational parameters, starting a secondary service for executing a list of interactive processes, each of which is assigned a second set of operational parameters, starting at least one background process from said list of background processes with said primary service, and starting at least one interactive process from said list of interactive processes with said secondary service, such that said primary service and said secondary service provide an ordered multi-phased startup of said background processes and said interactive processes.

2. A method according to claim 1, further comprising the step of monitoring the execution status of said background processes.

3. A method according to claim 2, further comprising the step of restarting a background process as a function of said monitored execution status.

4. A method according to claim 1, further comprising the step of configuring said primary service and said secondary service prior to said step of starting said primary service.

5. A method according to claim 4, wherein said configuring step further comprises defining said list of background processes that are ready for execution, associating with said primary service a first tag identifying said list of background processes, defining said list of interactive processes that are ready for execution, and associating with said secondary service a second tag identifying said list of interactive processes.

6. A method according to claim 1, wherein said step of starting said list of background processes includes starting all processes in said list of background processes and setting a synchronization flag.

7. A method according to claim 6, further comprising the step of delaying said execution of said list of interactive processes until said synchronization flag is set.

8. A method according to claim 6 further comprising the steps of starting a ternary service for executing a list of optional background processes, each being assigned a first operational parameter, prior to the step of starting at least one background process, and starting said list of optional background processes, after the step of setting said synchronization flag.

9. A method according to claim 1, further comprising the step of starting an asynchronous process prior to the step of starting at least one background process.

10. A method according to claim 1, further comprising the step of creating an environment for said background processes prior to the step background process.

11. A method according to claim 1, further comprising the step of creating an environment for said interactive processes prior to the step of starting at least one interactive process.

12. A method according to claim 1, further comprising the steps of selecting said first operational parameter to be a first security level and selecting said second operational parameter to be a second security level, wherein said first security level is higher than said second security level.

13. A computerized data processing method for emulating a foreign operating system by managing a plurality of services having different and segregated operational parameters, said method comprising the successive steps of starting a primary service for executing a list of background processes, each background process being assigned a first set of operational parameters that define an operating environment for core processes of the foreign operating system, starting a secondary service for executing a list of interactive processes, each interactive process being assigned a second set of operational parameters that define an operating environment for non-core processes of the foreign operating system, starting at least one background process from said list of background processes with said primary service, and starting at least one interactive process from said list of interactive processes with said secondary service, such that said primary service and said secondary service provide an ordered multi-phased startup of said background processes and said interactive processes.

14. A data processing apparatus for emulating a foreign operating system by managing a plurality of processes executing under differing operational parameters, comprising a configuration database for storing and retrieving an executable instruction set, and an operating system coupled with said configuration database for executing said instruction set, said operating system including means for starting a primary service for executing a list of background processes, each of which is assigned a first set of operational parameters means for starting a secondary service for executing a list of interactive processes, each of which is assigned a second set of operational parameters, means for executing said list of background processes with said primary service, and means for executing said list of interactive processes with said secondary service, such that said primary service and said secondary service provide an ordered multi-phased startup of said background processes and said interactive processes.

15. A data processing apparatus according to claim 14, wherein said operating system further comprises a service controller for monitoring the execution status of said processes.

16. A data processing apparatus according to claim 15, wherein said service controller further comprises means for restarting said processes as a function of the monitored execution status.

17. A data processing apparatus according to claim 14, wherein said configuration database further comprises means for storing a first list of processes ready for execution, and wherein said operating system further comprises means for associating with a first service a first tag identifying said first list of processes.

18. A data processing apparatus according to claim 14, wherein said operating system further comprises a service controller for setting a synchronization flag, said synchronization flag identifying the execution of all background processes.

19. A data processing apparatus according to claim 18, wherein said operating system further comprises
   means for starting a third service for executing a list of optional background processes at said first operational parameter, and
   means for executing said list of optional background processes as a function of said synchronous flag.

20. A data processing apparatus according to claim 18, wherein said service controller further comprises means for delaying the execution of said interactive processes until said synchronization flag is set.

21. A data processing apparatus according to claim 14, wherein said operating system further comprises means for starting an asynchronous process.

22. A machine readable data storage medium, comprising
   means for starting a primary service for executing a list of background processes, each of which is assigned a first set of operational parameters,
   means for starting a secondary service for executing a list of interactive processes, each of which is assigned a second set of operational parameters,
   means for executing said list of background processes with said primary service, and
   means for executing said list of interactive processes with said secondary service
   such that said primary service and said secondary service provide an ordered multi-phased startup of said background processes and said interactive processes.

23. A machine readable data storage medium according to claim 22, further comprising means for monitoring the execution status of said processes.

24. A machine readable data storage medium according to claim 23, further comprising means for restarting said processes as a function of the monitored execution status.

25. A machine readable data storage medium according to claim 22, further comprising means for configuring a first service.

26. A machine readable data storage medium according to claim 25, further comprising
   mean for defining a first list of processes ready for execution, and
   means for associating with said first service a first tag identifying said first list of processes.

27. A machine readable data storage medium according to claim 22, further comprising means for setting a synchronization flag, said synchronization flag identifying the execution of all background processes.

28. A machine readable data storage medium according to claim 27, further comprising
   means for starting a third service for executing a list of optional background processes at said first operational parameter, and
   means for executing said list of optional background processes as a function of said synchronous flag.

29. A machine readable data storage medium according to claim 27, further comprising means for delaying the execution of said interactive processes until said synchronization flag is set.

30. A machine readable data storage medium according to claim 22, further comprising means for starting an asynchronous process.

31. A method according to claim 1, wherein each background process is assigned a first set of operational parameters that define an operating environment for core processes of the foreign operating system, and wherein each interactive process is assigned a second set of operational parameters that define an operating environment for non-core processes of the foreign operating system.

* * * * *

UNITED STATES PATENT AND TRADEMARK OFFICE
CERTIFICATE OF CORRECTION

PATENT NO. : 5,907,701
DATED : May 25, 1999
INVENTOR(S) : Hanson

It is certified that error appears in the above-identified patent and that said Letters Patent is hereby corrected as shown below:

Col. 7, line 12, "For instance," begins a new paragraph.
Col. 7, line 66, change "apparatus I 0" to -- apparatus 10 --.
Col. 14, line 14, after "prior to the step", insert -- of starting at least one --.
Col. 14, line 57, after "operational parameters", insert --, --.

Signed and Sealed this

Sixteenth Day of November, 1999

Attest:

Q. TODD DICKINSON

*Attesting Officer*        Acting Commissioner of Patents and Trademarks